United States Patent
Kascha

(10) Patent No.: US 8,223,007 B2
(45) Date of Patent: Jul. 17, 2012

(54) METHOD FOR ENSURING OR MAINTAINING THE FUNCTION OF A COMPLEX COMPLETE SAFETY-CRITICAL SYSTEM

(75) Inventor: Reinhold Kascha, Altenstadt (DE)

(73) Assignee: Continental Teves AG & Co. oHG (DE)

( * ) Notice: Subject to any disclaimer, the term of this patent is extended or adjusted under 35 U.S.C. 154(b) by 451 days.

(21) Appl. No.: 12/516,671

(22) PCT Filed: Nov. 26, 2007

(86) PCT No.: PCT/EP2007/062782
§ 371 (c)(1), (2), (4) Date: May 28, 2009

(87) PCT Pub. No.: WO2008/065059
PCT Pub. Date: Jun. 5, 2008

(65) Prior Publication Data
US 2010/0066526 A1    Mar. 18, 2010

(30) Foreign Application Priority Data

Nov. 30, 2006   (DE) .................. 10 2006 056 668

(51) Int. Cl.
*B60Q 1/00* (2006.01)
(52) U.S. Cl. .................................................. 340/459
(58) Field of Classification Search ............. 340/459, 340/425.5, 426.32, 426.31, 825.22; 701/91
See application file for complete search history.

(56) References Cited

U.S. PATENT DOCUMENTS

| | | | |
|---|---|---|---|
| 5,795,039 A * | 8/1998 | Fennel et al. ............ | 303/122.05 |
| 5,957,985 A * | 9/1999 | Wong et al. .............. | 701/33 |
| 6,389,350 B1 * | 5/2002 | Fennel ..................... | 701/91 |
| 2006/0156073 A1 | 7/2006 | Fachinger et al. | |

FOREIGN PATENT DOCUMENTS

| | | |
|---|---|---|
| DE | 41 18 692 A1 | 12/1992 |
| DE | 44 14 980 A1 | 11/1995 |
| DE | 197 53 907 A1 | 6/1999 |
| GB | 2 256 505 A | 12/1992 |
| WO | WO 2004/005090 A2 | 1/2004 |
| WO | WO 2004/005096 A | 1/2004 |

\* cited by examiner

*Primary Examiner* — Phung Nguyen
(74) *Attorney, Agent, or Firm* — RatnerPrestia

(57) ABSTRACT

A method, the use thereof and a computer program product for maintaining the operation of a safety-critical overall vehicle regulatory and/or control system in the event of the occurrence of errors, in which the overall system is divided into system components on the basis of the findings of an error source analysis, in which modes of operation are also defined for the individual system components, and also, in the event of the occurrence of errors in the overall system, the error sources including the signals are analyzed and those methods of operation which are affected by the errors or signals which have occurred are ascertained, wherein on the basis of the error source analysis, those modes of operation of the individual system components which are not affected by the errors are taken and those which ensure an optimum or prescribed response from the overall system are selected.

12 Claims, 3 Drawing Sheets

METHOD FOR ENSURING OR MAINTAINING THE FUNCTION OF A COMPLEX COMPLETE SAFETY-CRITICAL SYSTEM

CROSS REFERENCE TO RELATED APPLICATIONS

This application is the U.S. national phase application of PCT International Application No. PCT/EP2007/062782 filed Nov. 26, 2007, which claims priority to German Patent Application No. DE 102006056668.8, filed Nov. 30, 2006, the contents of such applications being incorporated by reference herein.

BACKGROUND OF THE INVENTION

1. Field of the Invention

The invention relates to a method and to the use thereof and to a computer program product for ensuring or maintaining the function of a complex complete safety-critical system.

2. Description of the Related Art

WO 2004/005096 A1 discloses a method for safeguarding or maintaining the operation of a complex safety-critical overall system, such as a motor vehicle regulatory system, e.g. an electrical, electrohydraulic or electromechanical braking system (Brake-by-Wire), an electronic steering system (Steering-by-Wire), etc., in the event of the occurrence of errors or malfunctions.

Safety-related systems having a multiplicity of different subsystems, in some cases based upon one another, require measures which safeguard a defined manner of operation even in the event of operational errors and in the event of failure of individual system components (e.g. ESP, ABS, TCS, etc.). Without a safety concept, even a relatively insignificant error results in total failure of a subsystem or even in the overall regulation.

A simple error source analysis as a result of the processing of particular, stored error patterns works only in a clear system with a small number of single errors. In a complex overall system, there are so many combinations of errors that, on the basis of the method of error pattern handling, only the most probable error patterns can be taken into account. In all other cases, the overall system is completely immobilized for safety reasons. This is unacceptable, however, if the overall system is a controller for electrical steering (without a mechanical fallback level).

The method known from WO 2004/005096 A1, which method relates to an integrated overall system (the overall system performs only a primary task, that is to say the control/regulation of a braking system, for example), therefore performs error splitting for each individual system component (e.g. pressure sensor, wheel speed sensor on the front-left wheel, etc.). In addition, individual emergency operation modes are defined for each system component. A selection system is then defined which is used to establish what modes of operation are admissible for all system components on the basis of the recognized single error.

The initial error analysis performed by the above method provides the following results:
  the system is split into mutually independent system components;
  the modes of operation are defined for each individual system component (besides "available/unavailable", various emergency operation modes can be defined);
  a selection system, e.g. in the form of a decision matrix, is formed which is used to establish what modes of operation are admissible for all system components on the basis of the recognized "single error".

In line with the known method, all sources of error are analyzed permanently (in each loop). When an error occurs, the affected system components are denied all correlated modes of operation. This achieves system-wide component degradation. From the modes of operation which are still available for the system components on the basis of the error analysis, stipulations of a mode selection system are finally taken as a basis for selecting and using those modes of operation which guarantee the optimum behavior of the overall system under the given conditions.

Although the method above basically achieves the primary object of multiple error suitability for an error handling method, the method disadvantageously evaluates exclusively system errors and faults. It does not matter whether the component availability is influenced on the basis of a system error/a system fault or on the basis of configuration measures or special system states (diagnosis and the like).

In addition, the known error handling method presupposes that it adopts a centralized position in the overall vehicle regulatory and/or control system and that all the system components are covered and available in its range of action. On the basis of this requirement, the method cannot be used in such overall regulatory and/or control systems which are distributed over the motor vehicle.

A further drawback of the known system is that many input signals in the aforementioned mode-of-operation computation system (such as final errors, online configuration signals, etc.) have a quasi-steady nature, i.e. they change their state no more than once during an operating cycle. The evaluation of these signals, which is performed afresh in each computation step, is very computation intensive.

Finally, the known method is also disadvantageous to the extent that, in each computation step, the modes of operation to be used need to ascertained even if the modes of operation which are still available for the system components have not experienced any change. Not least because of the high computation involvement does it appear not to make sense to select the modes of operation to be used for definite.

SUMMARY OF THE INVENTION

The invention relates to a method which makes it possible to maintain the operation or emergency operation of a complex safety-critical system distributed in the vehicle in the event of the occurrence of an arbitrary error, an arbitrary number of errors or error combinations, and in so doing to take up less computation time.

BRIEF DESCRIPTION OF THE DRAWINGS

Further preferred embodiments are obtained from the subsequent description of an exemplary embodiment with reference to figures, in which.

DETAILED DESCRIPTION OF THE PREFERRED EMBODIMENTS

On the basis of the method, the overall system (e.g. an electronic motor vehicle braking system with ABS, ESP and further subfunctions) is divided into system components according to the findings of an error source analysis.

Figure 1:
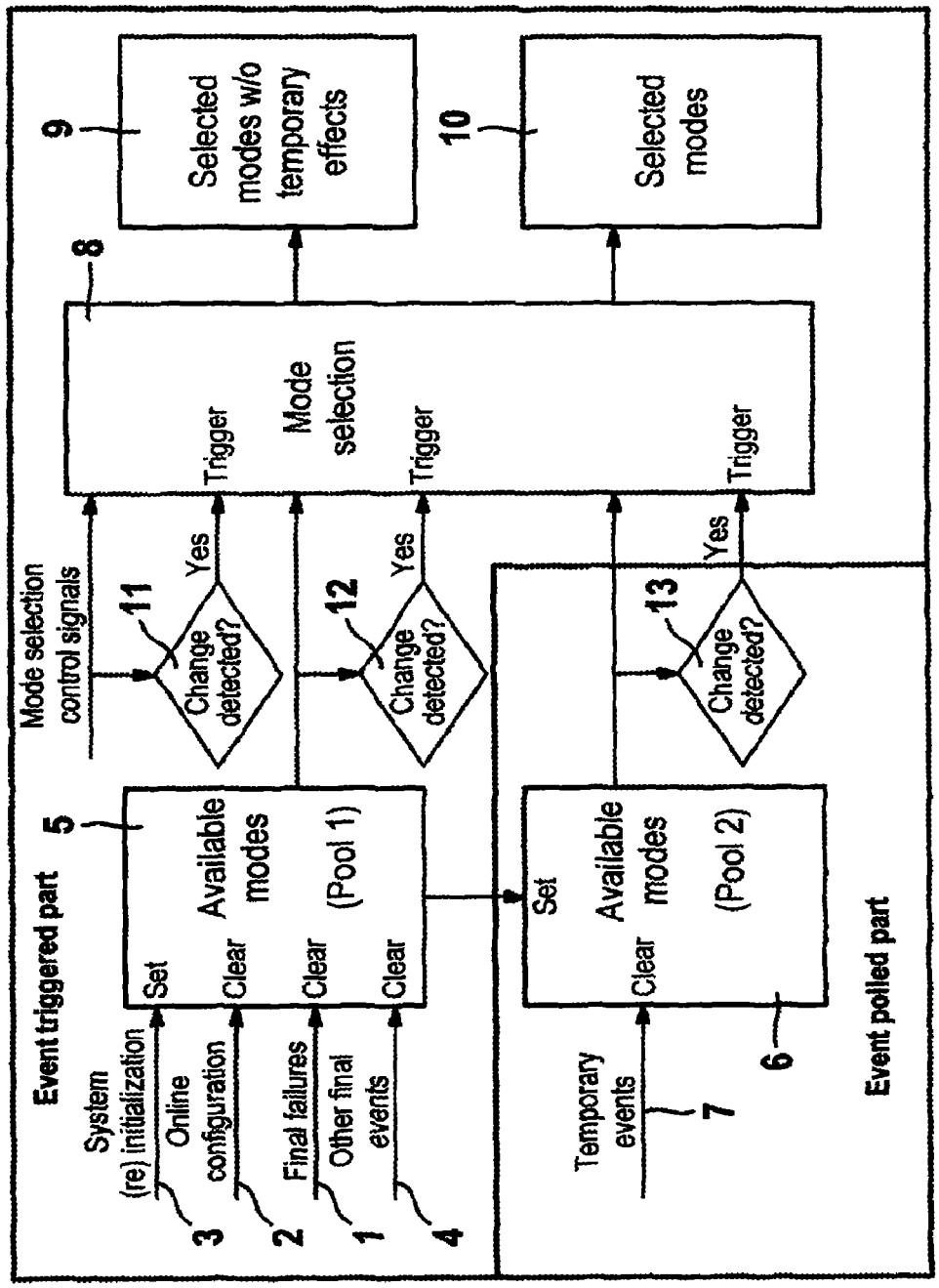
FIG. 1 shows a schematic block diagram to explain the function blocks of the method according to aspects of the invention.

For the individual system components (e.g. sensors or regulatory functions of the braking system), respective modes of operation are defined which are stored in blocks 5 and 6 in FIG. 1, for example.

In the event of the occurrence of errors and/or events (reference symbols 1 to 4 and 7 in FIG. 1) in the overall system, the error sources are analyzed and those modes of operation which are affected by the errors which have occurred are ascertained. This is effected in blocks 5 and 6, for example.

Accordingly, in block 8 (mode selection), on the basis of the error source analysis and according to the stipulations of a selection system, those modes of operation of the individual system components which are not affected by the errors/events, i.e. are still available, are taken and those which, in view of the errors/events which have occurred, ensure an optimum or prescribed response from the overall system or at least the maintenance of the operation of the overall system are selected.

A particular feature of the method according to aspects of the invention is that the definition of the errors and/or events of system components involves at least classification into:

a) only intermittently occurring errors/events which cause intermittent disconnection or restriction of the system and/or of a subfunction, and
b) errors/events which cause ultimate disconnection or restriction of the system and/or of a subfunction.

This course of action is made clear by the split of the modes into blocks 5 and 6 in FIG. 1.

In distributed systems, in which a plurality of controllers communicate with one another via bus systems in order to form an overall system (e.g. AUTOSAR), the system components are no longer independent of one another. It is therefore preferred to be able to take account of these "external" system components in the error analysis at the same time, to treat the operating states of external controllers as events and to process said operating states during the error analysis. In this way, it is possible to make a statement about the availability for the overall system even in the case of distributed controllers.

Preferably, the system component selection in block 8 first of all takes account only of final errors/events (data record in block 5). The data record adjusted in this way can be transferred particularly preferably to a fresh error analysis step. This is symbolized by block 6. By using adjusted data records, the method can more easily make a statement about the final system degradation in comparison with the method of the generic type.

The modes of operation are evaluated in terms of their effect on the system preferably once at the start of the method. In addition, they are evaluated whenever an error or an event occurs. During the error analysis performed on the basis of the prior art, the evaluation was constantly repeated in a loop. The event-controlled evaluation described above thus results in significantly less computation time being used up.

The mode-of-operation selection determines the modes of operation to be used for a system component. In this case, it is expedient for the modes of operation only ever to be selected afresh when a change in the error or signal association for a component occurs.

Preferably, besides errors and faults, all other signal types which either influence the component availabilities or the modes-of-operation selection system are also evaluated without restriction and with equal authorization. This includes, by way of example, compile-time and on-line configuration, particularly system states such as system initialization and shutdown, internal diagnosis, diagnosis, calibration processes, inter alia. The modes-of-operation selection system can therefore be matched much more flexibly to the system states which occur.

In the example in FIG. 1, the various signal types, such as final errors 1, configuration events, initialization 3 and other final events 4, are evaluated in the left-hand portion in block 5 under event control. Block 5 contains a first data record with a selection of the modes of operation which are to be used, this data record having been adjusted by eliminating the modes of operation which become unavailable as a result of merely exclusively temporary events.

Block 6 comprises a second data record with a selection of the modes of operation which are to be used, including the modes of operation which become unavailable as a result of temporary events 7.

In block 8, the modes-of-operation selection takes place. This can take the second data record (block 6) as a basis for stipulating a particular mode on the basis of final and temporary events (block 10) or just a mode which results from the first data record, which handles the final events (block 9). The mode selection 8 is activated by various blocks 13 which can detect a change in the mode-of-operation availability or in the selection criteria.

The portion of the block diagram on a grey background is performed in every controller loop ("Event Polling"). It is thus not an event-controlled portion. The remaining portion of the block diagram, which is not on a grey background, is activated once at the beginning and only when an error or event occurs ("Event Triggered").

Figure 2:
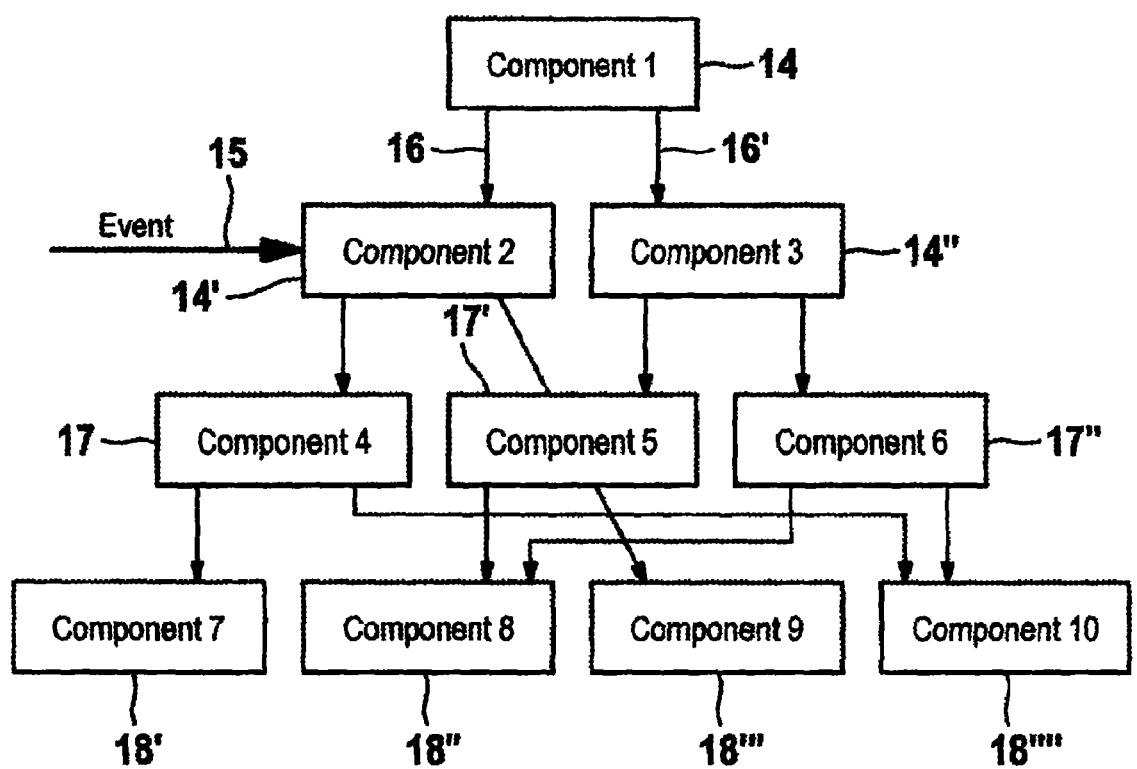
FIG. 2 shows a schematic illustration of components and the mode of action for events which are relevant to a component.

FIG. 2 explains the "error-dependent" withdrawal or restriction of subfunctions, which is also called degradation, for the individual system components 14 after the occurrence of an event 15. Event 15 relates to the component 14'. The component dependencies (for example the component ESP works only if the electronics and yaw rate sensor are in order) are then taken as a basis for breakdown into the components 17, 18', 18''', 18'''' and propagation. If an error (or another relevant event) occurs, first of all exclusively the availability of the correlated modes of operation of the relevant component 14' is thus denied and not, as described in the prior art, the availability of the modes of operation of all components, including those affected only indirectly.

Figure 3:
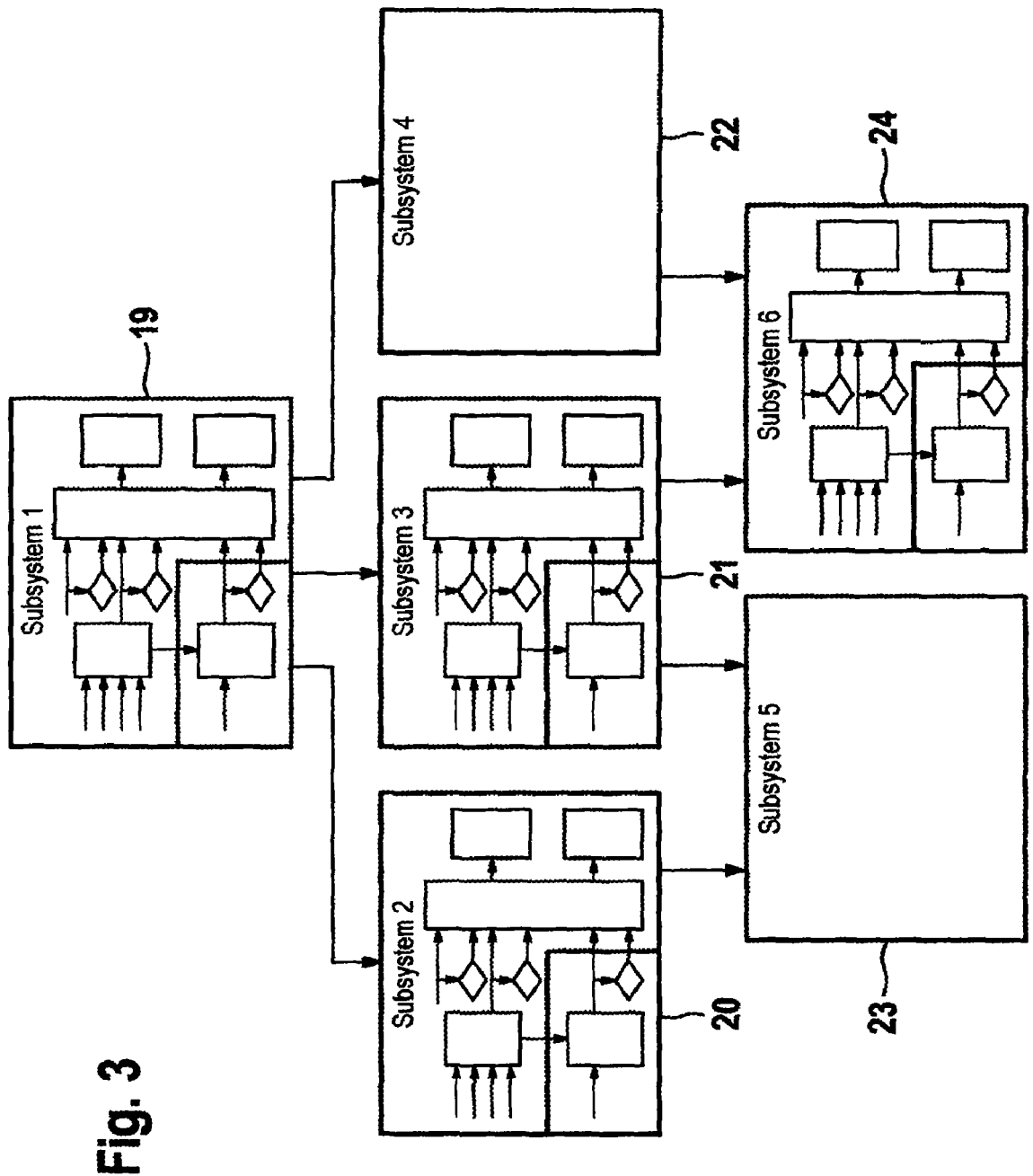
FIG. 3 shows a schematic illustration of the components of different subsystems.

The graphics in FIG. 3 illustrate the component degradation in further detail. The propagation of the degradation between the components of different subsystems 19 to 24 takes place in each subsystem in line with the method explained in connection with FIG. 1. The subsystems 22 and 23 on a grey background symbolize systems which are not part of the overall system (external subsystems). Component groups in which the degradation propagation is possible from the still available component modes of operation (primarily local components with a mode-of-operation selection on the basis of a principle of always selecting the best mode of a component) are combined into subsystems; by contrast, the degradation propagation between the components of different subsystems takes place on the basis of the modes of operation used.

The method according to aspects of the invention affords the advantage of a high level of computation time efficiency, since for the most part it works under event control. At the same time, the tasks of a system-management and error-correction system are handled. Ascertaining the system degradation with temporary events removed does not use any additional resources and allows simplified computation of the adequate warning level. Also, the proposed method allows simple handling of complex distributed systems, the individual subsystems of which (controllers, actuators, sensors, etc.) may have been created by third parties.

Finally, the invention also relates to the use of the above method in electronic motor vehicle braking systems, electronic steering systems, driver assistance systems or quite generally in vehicle controllers.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for safeguarding or maintaining an operation of a complex safety-critical overall vehicle regulatory and/or control system in the event of the occurrence of an error, malfunction or other event which influence the availability of subfunctions,
  in which the overall vehicle system is divided into system components on the basis of the findings of an error source analysis, in which modes of operation are also defined for the individual system components, and also, in the event of the occurrence of errors or events in the overall system, the error sources are analyzed and those methods of operation which are affected by the errors or events which have occurred are ascertained, and
  wherein, on the basis of the error source analysis and according to the stipulations of a selection system, those modes of operation of the individual system components which are not affected by the errors or events, are taken and those which, in view of the errors or events which have occurred, ensure an optimum or prescribed response from the overall system or at least the maintenance of the operation of the overall system are selected,
  wherein the definition of the errors or events of system components involves at least classification into: (i) only intermittently occurring errors or events which cause intermittent disconnection or restriction of the overall vehicle system and/or of a subfunction, and (ii) errors or events which cause ultimate disconnection or restriction of the overall vehicle system and/or of a subfunction,
  wherein a first error analysis step involves final errors being taken into account in the system component selection, and a further error analysis step involves intermittently occurring errors being additionally taken into account.

2. The method as claimed in claim 1, wherein the modes of operation are evaluated in terms of their effect on the overall vehicle system once at the start of the method and every time an error or an event occurs.

3. The method as claimed in claim 1, wherein besides intermittently occurring and final errors, events which influence either component availabilities or the modes of operation selection system are also evaluated without restriction and with equal authorization.

4. The method as claimed in claim 1, wherein operating states of external controllers are treated as events, so that said events can also be taken into account in the error analysis.

5. The use of the method as claimed in claim 1 in electronic motor vehicle braking systems, electronic steering systems, driver assistance systems or in vehicle controllers.

6. A computer program product which comprises a computer readable storage medium and an algorithm which performs a method as claimed in claim 1.

7. A method for safeguarding or maintaining an operation of a complex safety-critical overall vehicle regulatory and/or control system in the event of the occurrence of an error, malfunction or other event which influence the availability of subfunctions,
  in which the overall vehicle system is divided into system components on the basis of the findings of an error source analysis, in which modes of operation are also defined for the individual system components, and also, in the event of the occurrence of errors or events in the overall system, the error sources are analyzed and those methods of operation which are affected by the errors or events which have occurred are ascertained, and
  wherein, on the basis of the error source analysis and according to the stipulations of a selection system, those modes of operation of the individual system components which are not affected by the errors or events, are taken and those which, in view of the errors or events which have occurred, ensure an optimum or prescribed response from the overall system or at least the maintenance of the operation of the overall system are selected,
  wherein the definition of the errors or events of system components involves at least classification into: (i) only intermittently occurring errors or events which cause intermittent disconnection or restriction of the overall vehicle system and/or of a subfunction, and (ii) errors or events which cause ultimate disconnection or restriction of the overall vehicle system and/or of a subfunction,
  wherein operating states of external controllers are treated as events, so that said events can also be taken into account in the error analysis.

8. The method as claimed in claim 7, wherein a first error analysis step involves final errors being taken into account in the system component selection, and a further error analysis step involves intermittently occurring errors being additionally taken into account.

9. The method as claimed in claim 7, wherein the modes of operation are evaluated in terms of their effect on the overall vehicle system once at the start of the method and every time an error or an event occurs.

10. The method as claimed in claim 7, wherein besides intermittently occurring and final errors, events which influence either component availabilities or the modes of operation selection system are also evaluated without restriction and with equal authorization.

11. The use of the method as claimed in claim 7 in electronic motor vehicle braking systems, electronic steering systems, driver assistance systems or in vehicle controllers.

12. A computer program product which comprises a computer readable storage medium and an algorithm which performs a method as claimed in claim 7.

* * * * *